(12) United States Patent
Qiu et al.

(10) Patent No.: US 10,948,930 B2
(45) Date of Patent: Mar. 16, 2021

(54) THERMOSTATIC VALVE AND THERMAL MANAGEMENT ASSEMBLY HAVING SAME

(71) Applicant: Zhejiang Sanhua Automotive Components Co., Ltd., Zhejiang (CN)

(72) Inventors: Haoming Qiu, Zhejiang (CN); Bin Yin, Zhejiang (CN); Zhiyong Liao, Zhejiang (CN); Tianyi Zhang, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 8 days.

(21) Appl. No.: 16/471,525

(22) PCT Filed: Dec. 13, 2017

(86) PCT No.: PCT/CN2017/115773
§ 371 (c)(1),
(2) Date: Jun. 19, 2019

(87) PCT Pub. No.: WO2018/126856
PCT Pub. Date: Jul. 12, 2018

(65) Prior Publication Data
US 2020/0019198 A1 Jan. 16, 2020

(30) Foreign Application Priority Data

Jan. 3, 2017 (CN) .......................... 201710000479.2
Jan. 3, 2017 (CN) .......................... 201710000480.5
(Continued)

(51) Int. Cl.
*G05D 23/185* (2006.01)

(52) U.S. Cl.
CPC ................................. *G05D 23/1852* (2013.01)

(58) Field of Classification Search
CPC ............ G05D 23/1852; G05D 23/1333; F16H 57/0413; F16H 57/0417
See application file for complete search history.

(56) References Cited

U.S. PATENT DOCUMENTS 10,241,525 B2  3/2019  Qiu et al.
2006/0016900 A1*  1/2006  Brown ................ F16H 57/0413
236/34.5
(Continued)

FOREIGN PATENT DOCUMENTS

CN  2130981 Y  4/1993
CN  103851169 A  6/2014
(Continued)

OTHER PUBLICATIONS

International Search Report and Written Opinion for International Application No. PCT/CN2017/115773, dated Feb. 24, 2018.
(Continued)

*Primary Examiner* — Emmanuel E Duke
(74) *Attorney, Agent, or Firm* — Wolf, Greenfield & Sacks, P.C.

(57) ABSTRACT

A thermostatic valve includes a valve body, first and second elastic members, a valve seat assembly, a valve core, and a thermal actuator. The thermostatic valve includes six ports, four valve port portions each having a valve port, and a first cavity and a second cavity which are isolated from each other. One of the third port, the fourth port and the sixth port is in communication with the second cavity, and the other two of the third port, the fourth port and the sixth port are configured to be in communication with the second cavity through valve ports; and one of the first port, the second port and the fifth port is in communication with the first cavity, and the other two of the first port, the second port and the fifth port are configured to be in communication with the first cavity through valve ports.

17 Claims, 11 Drawing Sheets

(30) Foreign Application Priority Data

Jan. 3, 2017 (CN) .......................... 201710001023.8
Jan. 3, 2017 (CN) ......................... 201710003115.X

(56) References Cited

U.S. PATENT DOCUMENTS

| | | |
|---|---|---|
| 2009/0173798 A1 | 7/2009 | Mabboux |
| 2015/0185738 A1* | 7/2015 | Qiu .................... G05D 23/1333 236/101 A |
| 2015/0204453 A1* | 7/2015 | Qiu .................... G05D 23/1333 251/11 |
| 2016/0224037 A1* | 8/2016 | Qiu ........................ F01M 5/007 |

FOREIGN PATENT DOCUMENTS

| | | |
|---|---|---|
| CN | 204961799 U | 1/2016 |
| CN | 105697748 A | 6/2016 |
| CN | 205559961 U | 9/2016 |
| JP | S61-192981 A | 8/1986 |

OTHER PUBLICATIONS

Extended European Search Report for European Application No. 17889758.3, dated Jul. 31, 2020.

\* cited by examiner

THERMOSTATIC VALVE AND THERMAL MANAGEMENT ASSEMBLY HAVING SAME

This Application is a national stage filing under 35 U.S.C. § 371 of International Patent Application Serial No. PCT/CN2017/115773, filed Dec. 13, 2017, which claims priority to the following Chinese patent applications:

1) Chinese Patent Application No. 201710000479.2, titled "THERMOSTATIC VALVE", filed on Jan. 3, 2017 with the China National Intellectual Property Administration;

2) Chinese Patent Application No. 201710000480.5, titled "THERMOSTATIC VALVE", filed on Jan. 3, 2017 with the China National Intellectual Property Administration;

3) Chinese Patent Application No. 201710001023.8, titled "THERMOSTATIC VALVE", filed on Jan. 3, 2017 with the China National Intellectual Property Administration; and 4) Chinese Patent Application No. 201710003115.X titled "THERMAL MANAGEMENT ASSEMBLY", filed on Jan. 3, 2017 with the China National Intellectual Property Administration.

The entire contents of these applications are incorporated herein by reference in their entireties.

FIELD

The present application relates to the field of fluid control, in particular to a thermostatic valve capable of changing a fluid flow manner with temperature change, and a thermal management assembly having the same.

BACKGROUND

During running of a vehicle, its various components need to be lubricated timely by lubricating oil, so as to ensure the normal running of the vehicle. If the lubricating property of the lubricating oil, such as gearbox oil, is not good enough, the service life of the vehicle will be adversely affected. The temperature of the gearbox oil is generally adjusted by a temperature-controlled flow path constituted by a thermostatic valve and a heat exchanger for external cooling. When the temperature of the gearbox oil line increases, the heat-sensitive material of a thermal actuator expands due to heat, the passage for the gearbox oil to directly flow back to the gearbox is blocked, or the flow rate of the passage decreases, therefore the high temperature oil enters the heat exchanger for external cooling to be cooled and then flows back to the gearbox. Conversely, when the oil temperature is too low, the heat-sensitive material of the thermal actuator begins to solidify and contract, a push rod is reset and the passage for the gearbox oil to directly flow back to the gearbox is open. During flowing, the oil in the gearbox oil line exchanges heat with heat generating elements of the gearbox, to control the temperature of the oil to be within a proper range. With the development of vehicle technology, sometimes the temperature of the gearbox oil may be adjusted by heat exchange with a cooling fluid first, in which case the temperature control assembly or the thermostatic valve for temperature control need to be constructed in different ways.

SUMMARY

An object of the present application is to provide a thermostatic valve of a new structure capable of controlling two kinds of fluids at the same time. Therefore, the following technical solution is provided according to the present application.

A thermostatic valve includes a valve body, a first elastic member, a second elastic member, a valve seat assembly, a valve core, and a thermal actuator, the valve seat assembly includes a valve seat; the valve body includes a first valve body and a second valve body; the first elastic member, the second elastic member, the valve seat assembly, the valve core, and the thermal actuator are arranged in the valve body; and the valve seat assembly is fixed or limited relative to the valve body. The thermostatic valve includes six ports, the six ports include a first port, a second port, a third port, a fourth port, a fifth port, and a sixth port; the thermostatic valve includes four valve port portions each having a valve port, the four valve port portions include a first valve port portion, a second valve port portion, a third valve port portion, and a fourth valve port portion, the first valve port portion is arranged in the valve body, and the fourth valve port portion is arranged in the valve body. The thermostatic valve includes a first cavity and a second cavity, the first cavity is isolated from the second cavity, the first valve port portion is arranged in the second cavity, the fourth valve port portion is arranged in the first cavity, the first elastic member is arranged in the second cavity, the second elastic member is arranged in the first cavity, a part of the thermal actuator is arranged in the first cavity, and another part of the thermal actuator is arranged in the second cavity. One end of the thermal actuator abuts against the first elastic member, and another end of the thermal actuator abuts against the second elastic member; one of the third port, the fourth port and the sixth port is in communication with the second cavity, and the other two of the third port, the fourth port and the sixth port are configured to be in communication with the second cavity through valve ports; and one of the first port, the second port and the fifth port is in communication with the first cavity, and the other two of the first port, the second port and the fifth port are configured to be in communication with the first cavity through valve ports.

Thus, the thermostatic valve requires only one thermal actuator to control two fluids at the same time, making the system simpler.

Figure 15:
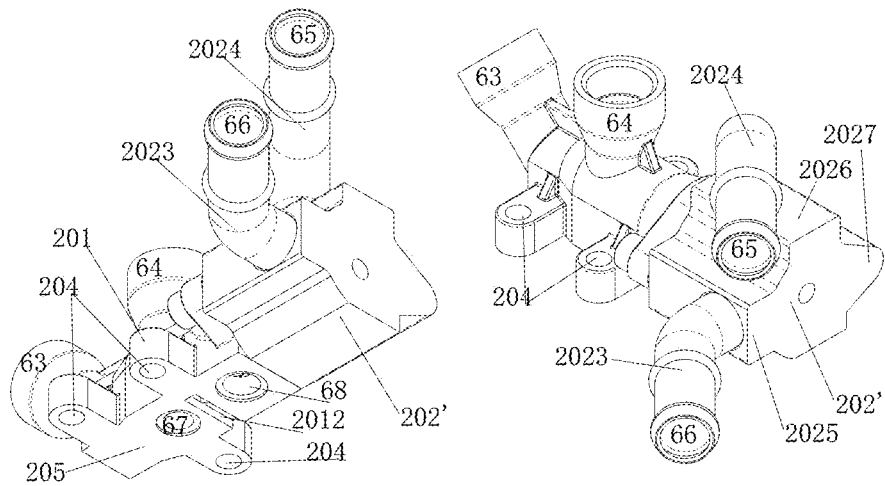
Figure 16:
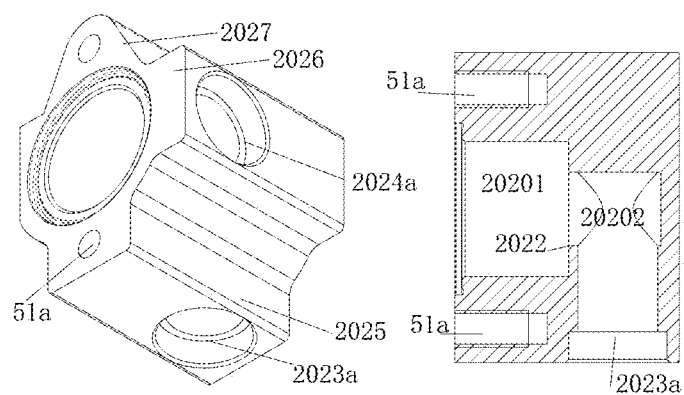
Figure 17:
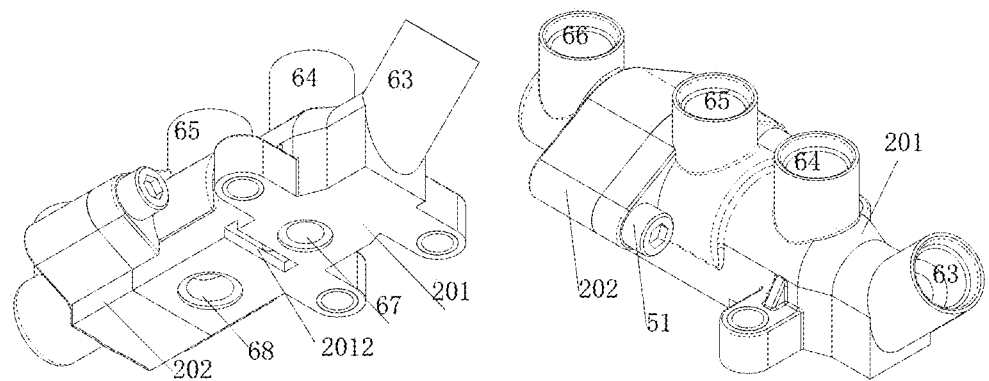
Figure 18:
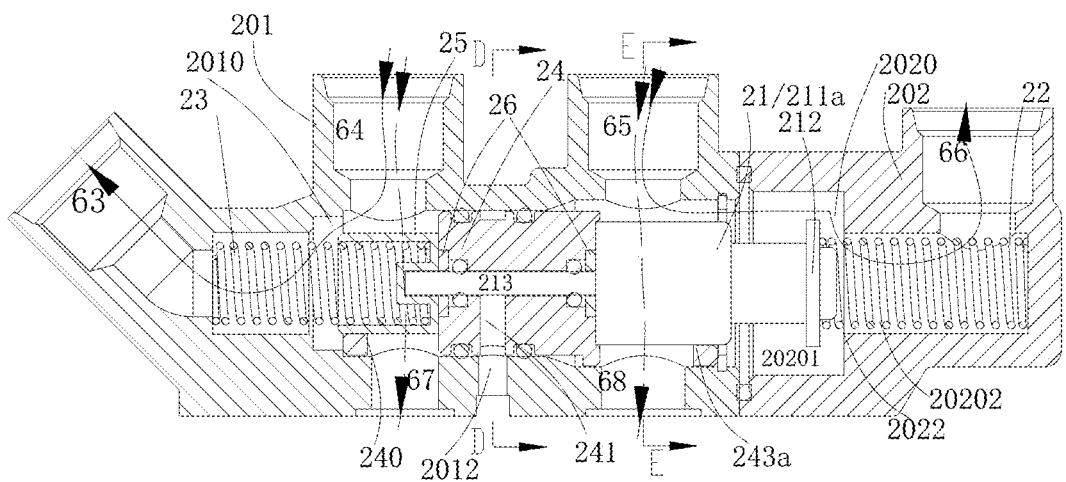
Figure 19:
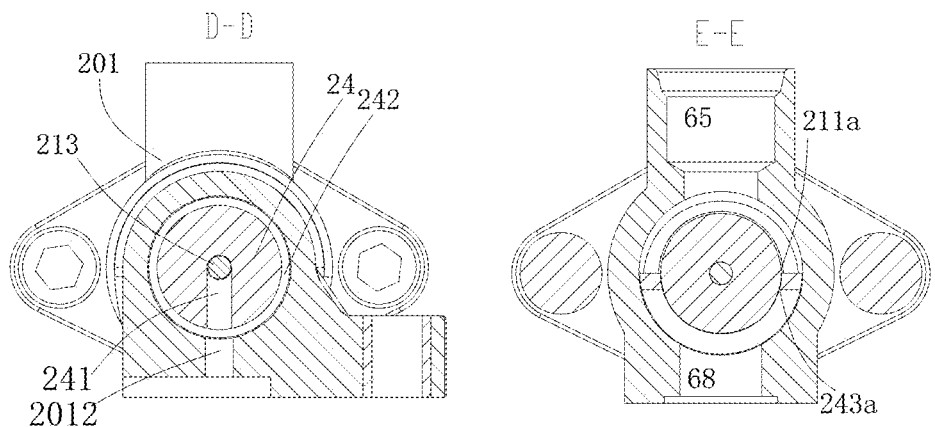
Figure 20:
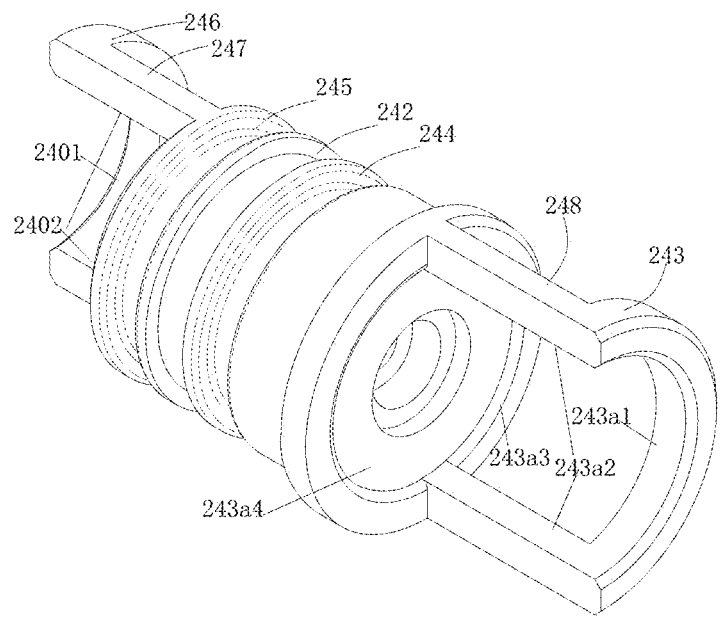
Figure 21:
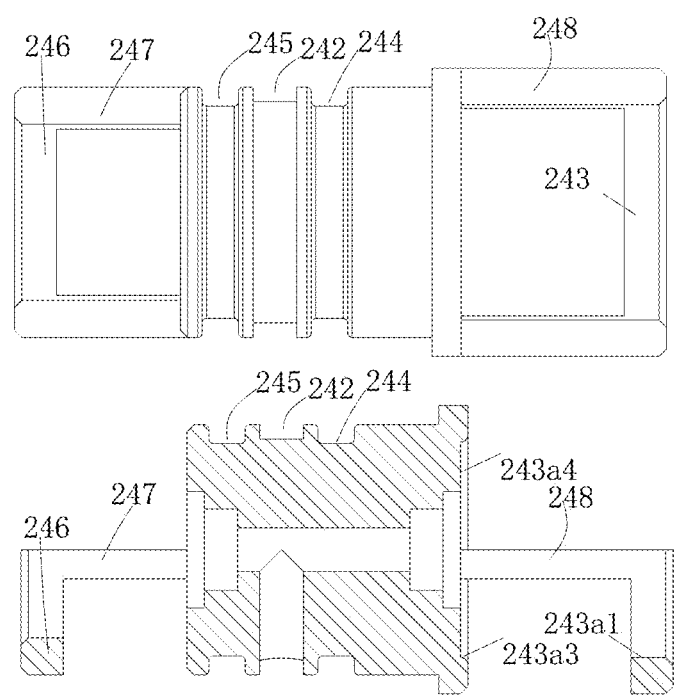

The solid arrows in the figures indicate the manner in which the fluid in the thermostatic valve can flow, and the dashed arrows indicate that the flow path may be blocked;

FIG. 15 is a perspective schematic view of a thermostatic valve according to a second embodiment, shown from two directions respectively;

FIG. 16 shows a perspective schematic view and a sectional schematic view of a second valve body of the thermostatic valve shown in FIG. 15;

FIG. 17 is a perspective schematic view of a thermostatic valve according to a third embodiment, shown from two directions respectively;

FIG. 18 is a sectional schematic view of the thermostatic valve shown in FIG. 17, wherein the solid arrows indicate the manner in which two fluids in the thermostatic valve can flow, and the dashed arrows indicate another manner in which the two fluids can flow when the thermostatic valve is in another working state;

FIG. 19 is a sectional schematic view of the thermostatic valve shown in FIG. 18 taken along line D-D and line E-E respectively;

FIG. 20 is a perspective schematic view of a valve seat of the thermostatic valve shown in FIG. 18; and FIG. 21 shows a schematic view of the valve seat shown in FIG. 20 seen from one direction and a corresponding sectional view.

DETAILED DESCRIPTION OF EMBODIMENTS

Figure 1:
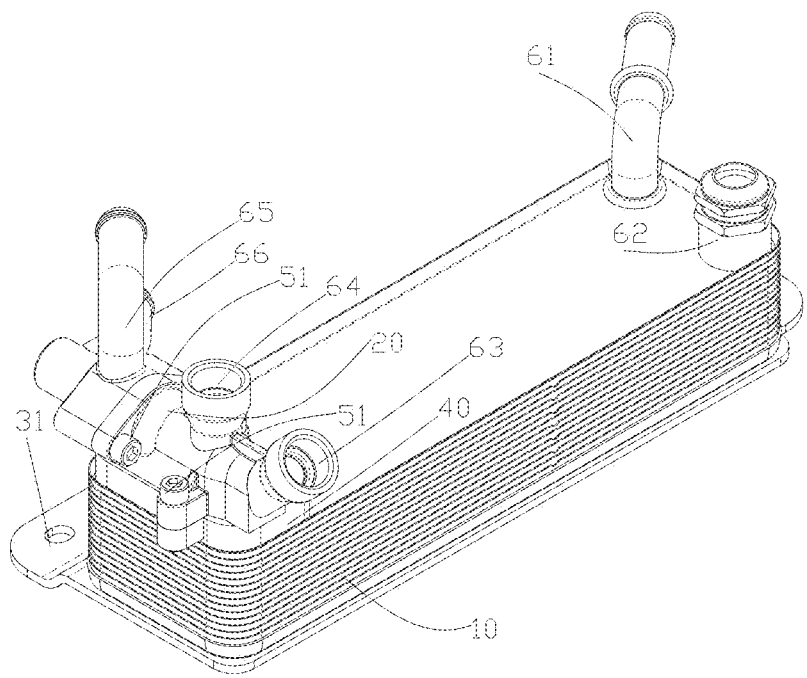
FIG. 1 is a perspective schematic view of a thermal management assembly having a thermostatic valve combined with a heat exchanger according to an embodiment of the present application.
Figure 2:
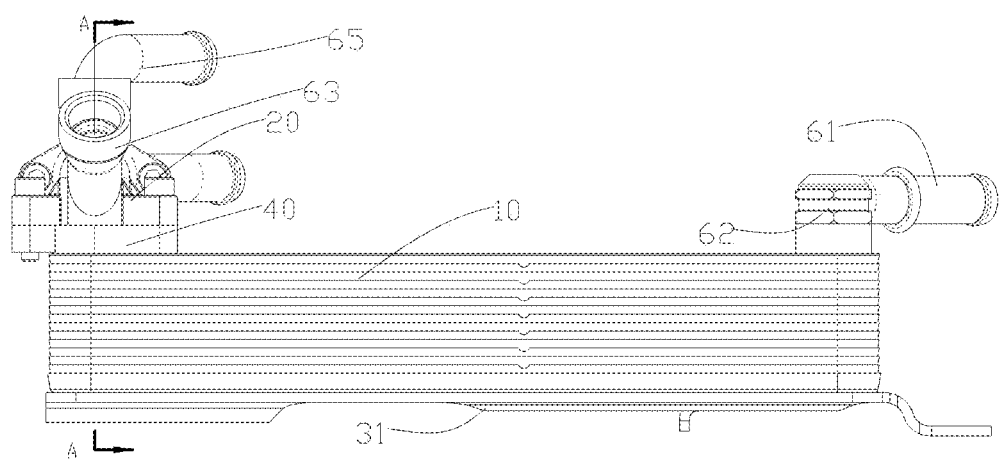
FIG. 2 is a front schematic view of the thermal management assembly shown in FIG. 1.
Figure 3:
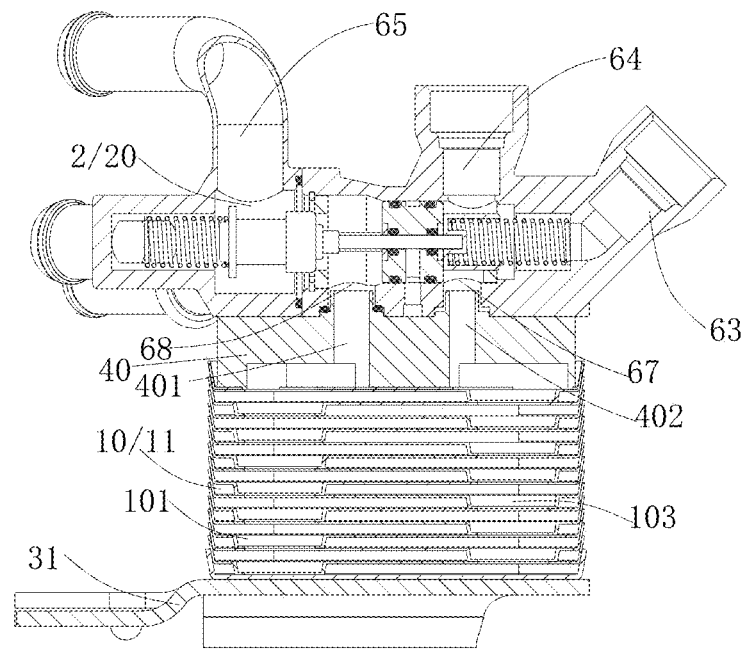
FIG. 3 is a sectional schematic view of the thermal management assembly shown in FIG. 2 taken along line A-A.
Figure 4:
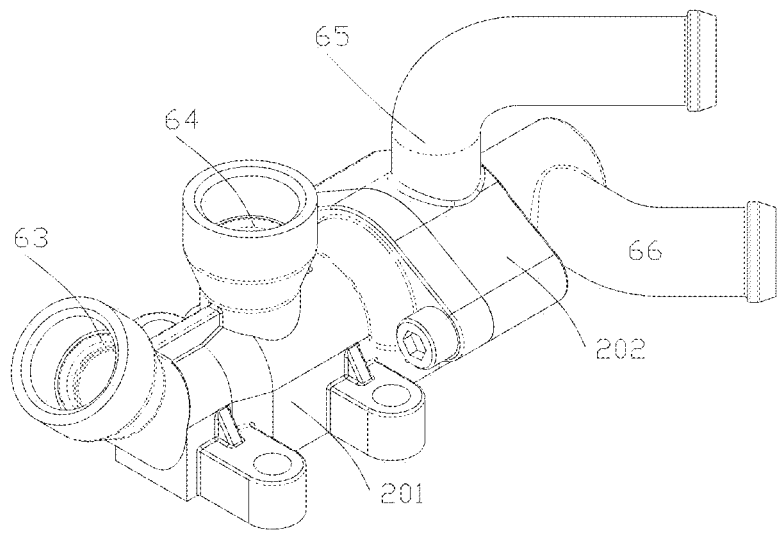
FIG. 4 is a perspective schematic view of the thermostatic valve shown in FIG. 1.
Figure 5:
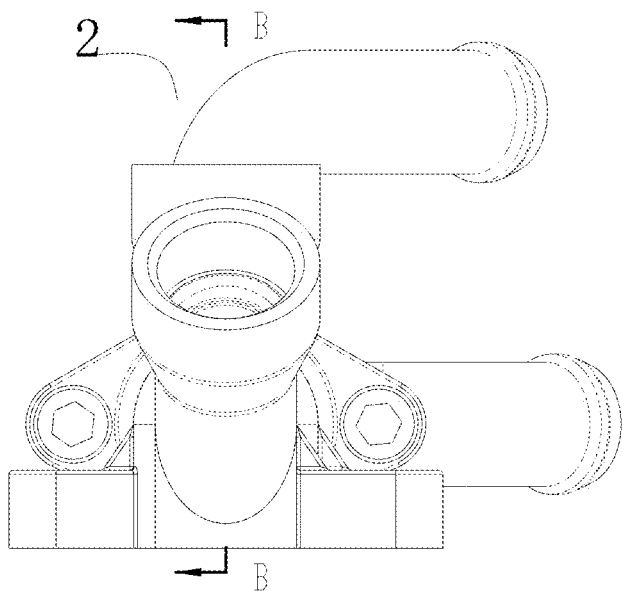
FIG. 5 is a schematic view of the thermostatic valve shown in FIG. 4 seen from one direction.
Figure 6:
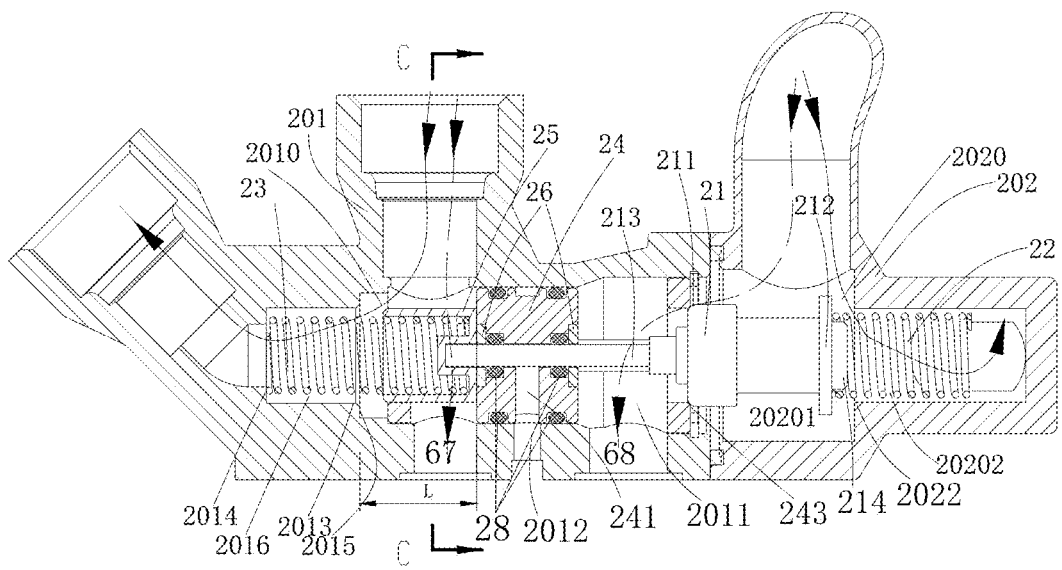
FIG. 6 is a sectional schematic view of the thermostatic valve shown in FIG. 5 taken along line B-B, wherein the solid arrows indicate the manner in which two fluids in the thermostatic valve can flow, and the dashed arrows indicate another manner in which the two fluids can flow when the thermostatic valve is in another working state.
Figure 7:
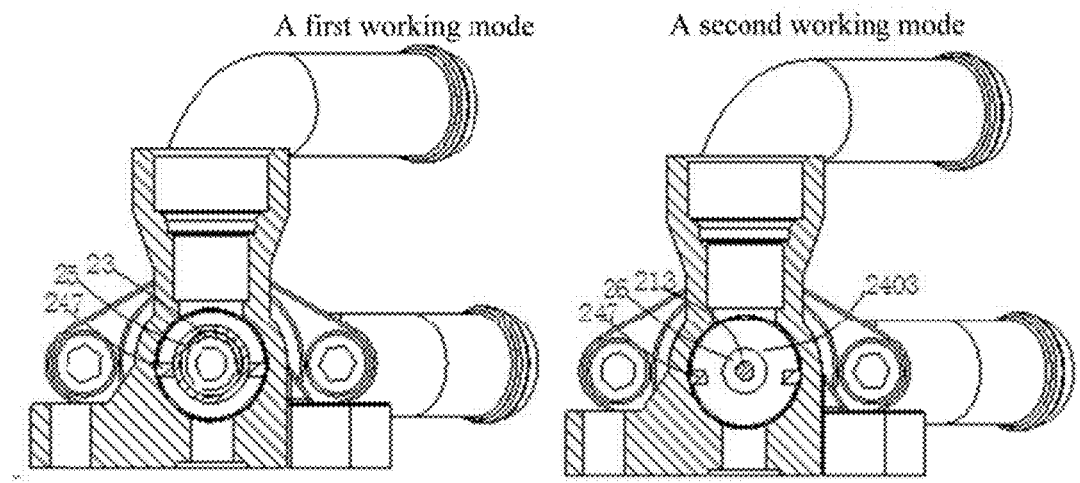
FIG. 7 is a sectional schematic view of the thermostatic valve shown in FIG. 6 in two working states taken along line C-C.
Figure 8:
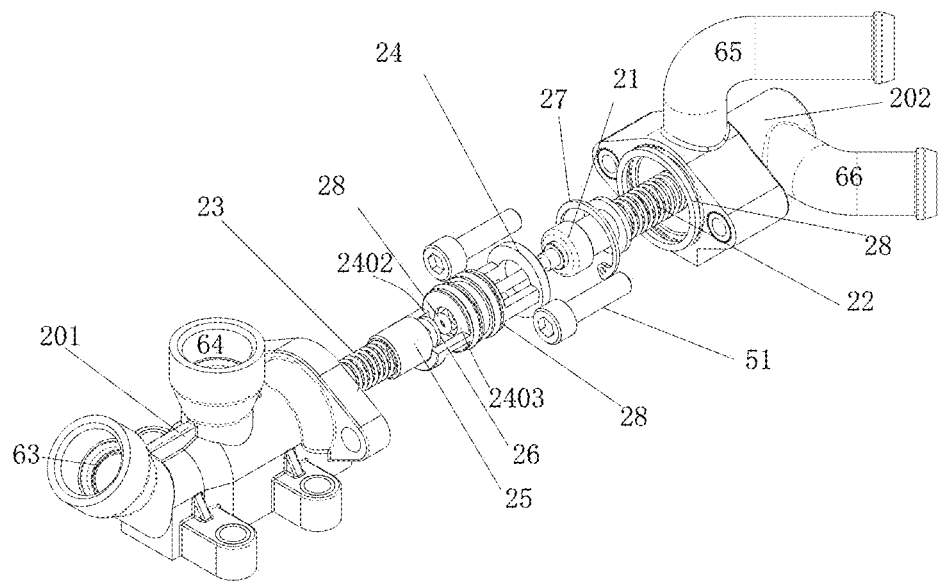
FIG. 8 is an exploded schematic view of the thermostatic valve according to the above embodiments.
Figure 9:
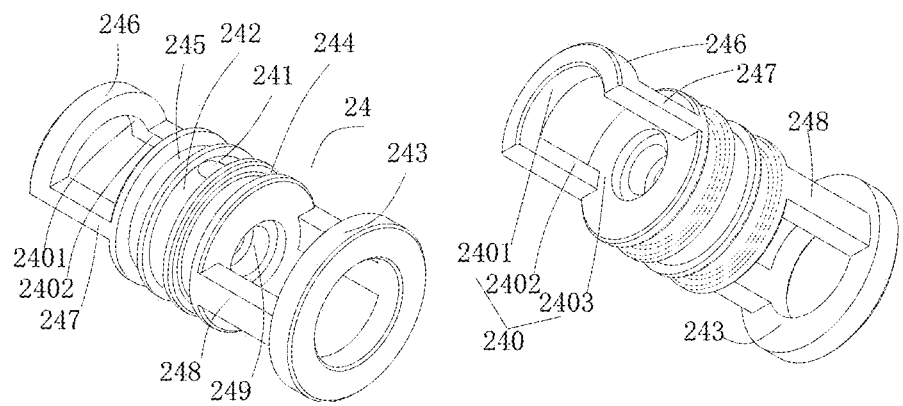
FIG. 9 is a perspective schematic view of a valve seat of the thermostatic valve according to the above embodiments, shown from two directions respectively.
Figure 10:
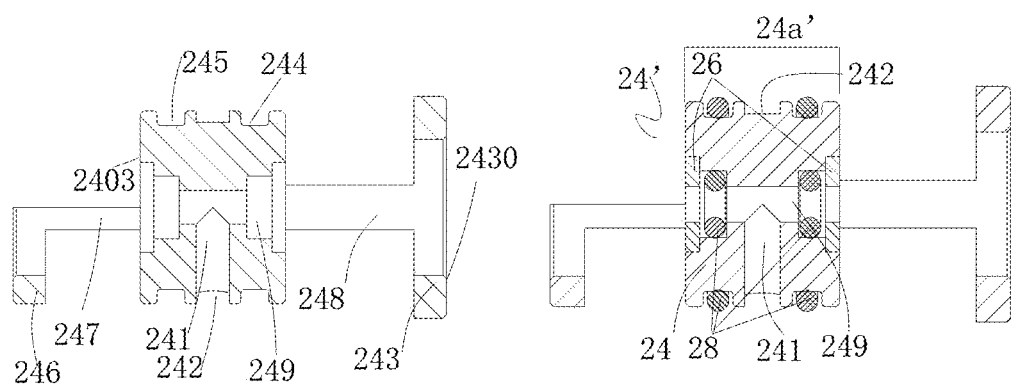
FIG. 10 shows sectional schematic views of the valve seat shown in FIG. 9 and the valve seat assembly assembled with sealing members.
Figure 11:
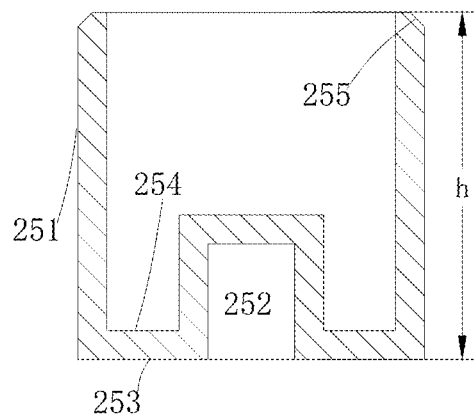
FIG. 11 is a sectional schematic view of a valve core of the thermostatic valve according to the above embodiments.
Figure 12:
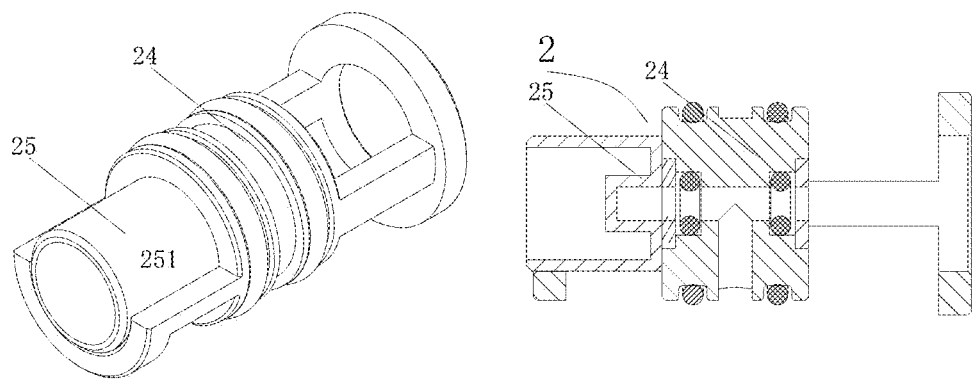
FIG. 12 shows a perspective schematic view and a sectional schematic view showing the cooperation between the valve seat assembly and the valve core.

The present application is described hereinafter in conjunction with drawings and specific embodiments. FIGS. 1 to 12 are related drawings of one specific embodiment. FIG. 1 is a perspective schematic view of a thermal management assembly having a thermostatic valve combined with a heat exchanger; FIG. 2 is a front schematic view of the thermal management assembly; FIG. 3 is a sectional schematic view of the thermal management assembly shown in FIG. 2 taken along line A-A; FIG. 4 is a perspective schematic view of the thermostatic valve shown in FIG. 1; FIG. 5 is a schematic view of the thermostatic valve seen from one direction; FIG. 6 is a sectional schematic view of the thermostatic valve taken along line B-B, wherein the solid arrows indicate the manner in which two fluids can flow when the thermostatic valve is in the present state shown in the figure, and the dashed arrows indicate another manner in which the two fluids can flow after the valve is operated, that is, when the thermostatic valve is in another working state; FIG. 7 is a sectional schematic view of the thermostatic valve shown in FIG. 6 in two working states taken along line C-C; FIG. 8 is an exploded schematic view of the thermostatic valve;

FIG. 9 is a perspective schematic view of a valve seat of the thermostatic valve, shown from two directions respectively; FIG. 10 is a sectional schematic view of the valve seat and the valve seat assembly of the thermostatic valve; FIG. 11 is a sectional schematic view of a valve core; and FIG. 12 shows a perspective schematic view and a sectional schematic view showing the cooperation between the valve seat assembly and the valve sleeve.

The thermostatic valve 2 includes a valve body 20 having a cavity therein, a first elastic member 22, a second elastic member 23, a valve seat assembly 24', a valve core 25, and a thermal actuator 21. The valve body 20 includes a first valve body 201 and a second valve body 202, and the valve seat assembly 24' includes a valve seat 24. The first elastic member 22, the second elastic member 23, the valve seat 24, the valve core 25, and the thermal actuator 21 are arranged in the cavity of the valve body 20, wherein the valve seat is fixed relative to the valve body, the first valve body 201 and the second valve body 202 are fixed to each other by bolts or screws 51, and sealing members 28 may be arranged at a joint portion of the first valve body 201 and the second valve body 202 to achieve a relative sealing. The valve body 20 is provided with six ports respectively capable of communicating with the outside, and the six ports include a first port 63, a second port 64, a third port 65, a fourth port 66, a fifth port 67, and a sixth port 68. The third port 65, the fourth port 66, and the sixth port 68 can be used for communication of a first fluid, and the first port 63, the second port 64, and the fifth port 67 can be used for communication of a second fluid. One of the third port 65, the fourth port 66 and the sixth port 68, for example, the third port 65 of the present embodiment shown in the figures, can be used as an inlet of the first fluid, and the other two ports can be used as outlets of the first fluid. One of the first port 63, the second port 64 and the fifth port 67, for example, the second port 64 of the present embodiment shown in the figures, can be used as an inlet of the second fluid, and the other two ports can be used as outlets of the second fluid. The valve core may be formed integrally, or may be constituted by two or more parts, that is, the valve core may have an integrally-formed structure or a combined structure of several parts.

The cavity of the valve body 20 includes a first cavity 2010, a third cavity 2011, and a second cavity 2020. The first cavity 2010 is sealed relative to the third cavity 2011, and the third cavity 2011 is arranged between the first cavity 2010 and the second cavity 2020. The second port 64 is in communication with the first cavity 2010, the third port 65 is in communication with the second cavity 2020, and the third cavity 2011 is in communication with the sixth port 68. The thermal actuator 21 includes a thermal actuator body, a push rod 213 and a heat sensitive substance filled in the thermal actuator, volume of the heat sensitive substance changes with temperature change, and volume change of the heat sensitive substance pushes the push rod 213 to move relative to the thermal actuator body, thereby causing the push rod to move relative to the thermal actuator body. The thermal actuator body includes a second portion 212 and a first portion 211, and the second portion 212 is relatively fixed to the first portion 211. The first portion 211 is arranged between the second portion 212 and an end of the push rod 213 extending beyond the thermal actuator body, and the push rod can move relative to the second portion 212 and the first portion 211 when the temperature changes. The second portion 212 is located in the second cavity 2020 or the second portion 212 is at least partially located in the second cavity 2020, and the above end portion of the push rod 213 is located in the first cavity 2010. An extending portion of the push rod is generally of an integrally-formed structure, or the extending portion of the push rod 213 is of a separated structure, and the above arrangement of the push rod may be realized in this way: one end portion of the push rod abuts other members such as an abutting member and the abutting member extends into the first cavity 2010, that is, the push rod further includes the abutting member. The push rod is arranged opposite to the second portion 212, the push rod and the second portion 212 abut the first elastic member 22 and the second elastic member 23 respectively, the abutting herein includes direct abutting and indirect abutting. Specifically, the second portion 212 abuts one end of the first elastic member 22, and another end of the first elastic member 22 abuts the second valve body 202 for position limiting; and the push rod 213 abuts one end of the second elastic member 23, where the push rod indirectly abuts the second elastic member 23 via the valve core 25, and another end of the second elastic member 23 abuts the first valve body 201 for position limiting, that is, two ends of the thermal actuator are respectively supported by the two elastic members.

The thermostatic valve 2 includes four valve ports, a first valve port is used for communication between the fourth port 66 and the third port 65, a second valve port is used for communication between the sixth port 68 and the third port 65, a third valve port is used for communication between the fifth port 67 and the second port 64, and a fourth valve port is used for communication between the first port 63 and the second port 64. In the present embodiment, a first valve port portion 2022 having the first valve port is located at a position of a communication passage between the third port 65 and the fourth port 66, a second valve port portion 243 is located at a position of a communication passage between the third port 65 and the sixth port 68, the third valve port portion 240 is located at a position of a communication passage between the second port 64 and the fifth port 67, and the fourth valve port portion 2013 is located at a position of a communication passage between the second port 64 and the first port 63. The first valve port portion 2022 is arranged on the second valve body 202, the fourth valve port portion 2013 is arranged on the first valve body 201, and the second valve port portion 243 and the third valve port portion 240 are arranged on the valve seat 24. Besides, the first valve port portion may be arranged on a second valve body component, that is, the first valve port portion may be arranged on another member which is fixed or limited relative to the first valve body, and the member is fixed or limited to the second valve body and forms the second valve body component together with the second valve body. The fourth valve port portion may also be arranged on a first valve body component, that is, the fourth valve port portion may be arranged on another member which is fixed or limited relative to the first valve body, and the member is fixed or limited to the first valve body and forms the first valve body component together with the first valve body. In addition, the second valve port portion and the third valve port portion are not necessarily arranged on the valve seat, and may also be arranged on another component fixed or limited relative to the first valve body or the valve seat assembly, and the component may be regarded as part of the valve seat assembly. The second portion 212 of the thermal actuator 21 cooperates with the first valve port portion 2022 to realize opening and closing of the first valve port, the first portion 211 of the thermal actuator 21 cooperates with the second valve port portion 243 to realize opening and closing of the second valve port, the valve core 25 cooperates with the third valve port portion 240 to realize opening and closing of the third valve port, and the valve core 25 cooperates with the fourth valve port portion 2013 to realize opening and closing of the fourth valve port. One of the first valve port and the second valve port may be selectively closed under certain conditions, and one of the third valve port and the fourth valve port may be selectively closed under certain conditions. As for this embodiment, in a case that the temperature is lower than a certain value, the second valve port and the third valve port are closed, and the first valve port and the fourth valve port are opened; while in a case that the temperature is higher than another specific value, the second valve port and the third valve port are opened, and the first valve port and the fourth valve port are closed.

The first elastic member 22 is located in the second cavity 2020, and the second elastic member 23 is located in the first cavity 2010. The first valve port divides the second cavity 2020 into a fourth cavity 20201 and a fifth cavity 20202, the fourth cavity 20201 is in communication with the third port 65, and the fifth cavity 20202 is in communication with the fourth port 66. The fourth cavity 20201 and the fifth cavity 20202 may communicate with each other or not through the first valve port; and the fourth cavity 20201 and the third cavity 2011 may communicate with each other or not through the second valve port. An initial deformation force of the first elastic member 22 is smaller than an initial deformation force of the second elastic member 23, and the initial deformation force of the second elastic member 23 is greater than an elastic force generated by the deformation of the first elastic member 22 when the second portion of the thermal actuator comes into contact with the first valve port and shuts off the first valve port. An initial deformation force mentioned in this specification refers to a pressure required by the spring, in a compressed condition when the product is not used, to deform when subjected to an external force.

The thermal actuator may further include a position-limiting portion 214, and the first elastic member 22 may be sleeved on the position-limiting portion, that is, the first elastic member is limited by the position-limiting portion 214. Accordingly, the thermal actuator is also supported by the first elastic member 22. A transition section is provided between the first portion and the second portion of the thermal actuator of this embodiment. Besides, the first portion and the second portion may be integrally formed, for example, formed as a cylindrical structure, one end of the cylinder serves as the first portion and functions as the first portion, and another end serves as the second portion and functions as the second portion. Or the first portion and the second portion may be a combination of two cylindrical structures having stepped portions, similarly, one end of the combined structure serves as the first portion and functions as the first portion, and another end of the combined structure serves as the second portion and functions as the second portion.

The valve seat assembly 24' is fixedly arranged relative to the valve body, and specifically may be limited in the cavity of the first valve body by a retainer 27. When assembling, the second elastic member, the valve core, and the valve seat assembly may be first assembled with the first valve body, then the retainer 27 is fitted into a corresponding groove of the first valve body 201, then the first elastic member and the thermal actuator are assembled with the second valve body, and then the two assembled valve bodies are assembled together and are fixed by bolts or the like. The valve seat assembly 24' is provided with a partitioning portion 24a'. The partitioning portion 24a' is used to partition the cavity in the valve body, and cooperates with the push rod to allow the first cavity 2010 to be relatively sealed and isolated from the third cavity 2011, which means that the partitioning portion 24a' enables the first cavity 2010 to be relatively sealed and isolated from the second cavity 2020 and the third cavity 2011, such that two sides of the partitioning portion 24a' can be used for different fluids. The valve seat assembly 24' includes the valve seat 24, a position-limiting member 26, at least one sealing member 28 limited at an outward portion of the valve seat, and at least one sealing member 28 limited at an inward portion of the valve seat. The sealing member 28 at the outward portion of the valve seat is configured to fit with an inner wall portion of the valve body to achieve sealing, and the sealing member 28 at the inward portion of the valve seat is arranged around the push rod 213 and is configured to be in a sliding fit with the push rod 213 to achieve dynamic sealing. The overall push rod may be a cylindrical structure, the size of a minimum portion of a hole 249 of the valve seat is greater than the size of the push rod of the thermal actuator by about 0.10 mm to 0.5 mm, and the position-limiting member 26 is configured to limit the position of the sealing member 28 for dynamic sealing, so that the sealing member will not fall off during operation. In a case that the sealing can be achieved or the sealing requirements are not too high, one sealing member 28 may be provided on each of the inner and outer sides of the valve seat, which is relatively simple. Two sealing members may be provided on each of the inner and outer sides of the valve seat to ensure the sealing, if the sealing requirements are relatively high. As shown in FIG. 10 and FIG. 6, two grooves are provided at the relatively outward portion of the valve seat, which are groove 245 and groove 244, and one sealing member 28 is limited in each of the grooves for fitting with the inner wall portion of the valve body to achieve sealing. Two sealing member receiving portions are provided at the inward portion of the valve seat as well, and the position-limiting member 26 is used to limit the position of the sealing members 28 after the sealing members 28 are placed in the sealing member receiving portions.

The valve seat 24 includes the second valve port portion 243 and the third valve port portion 240. The valve seat 24 includes at least two first columnar portions 247, at least two second columnar portions 248, and an isolating portion. The isolating portion is relatively arranged between the first columnar portions 247 and the second columnar portions. The first columnar portions 247 and the second columnar portions 248 also serve as connecting portions, the second columnar portions 248 connect the second valve port portion 243 to the isolating portion, and the first columnar portions 247 herein as a part of the third valve port portion 240 connect another part of the third valve port portion 240, that is, an annular portion 246, to the isolating portion. An inner surface of the first columnar portion 247 has a substantially circular arc-like structure as viewed from an axial direction, and extends in the axial direction to present a substantially columnar structure, and an inner surface of the second columnar portion 248 may be a substantially circular arc-like structure as viewed from the axial direction, in other words, inner sides of cross sections of the two columnar portions may be two circular arcs. The second valve port portion 243 is of a substantially annular structure, and an end portion 2430 of an inner hole of the second valve port portion 243 serves as the second valve port to cooperate with the first portion of the thermal actuator. The valve seat 24 is further provided with an inner hole 249 at the isolating portion, and the push rod can pass through the inner hole 249. The third valve port portion 240 includes the semi-annular portion 246, two first columnar portions 247, and a portion of an end surface 2403 of the isolating portion facing the first columnar portions 247. An inward first wall portion 2401 of the semi-annular portion 246, inward second wall portions 2402 of the two first columnar portions 247, and the end surface 2403 of the isolating portion facing the first columnar portions 247 constitute the third valve port. Shapes of the first wall portion 2401 and the inward second wall portions 2402 of the two first columnar portions 247 match a shape of the valve core 25, and the valve core is in a sliding fit with the third valve port portion 240. The maximum distance between the inward second wall portions 2402 of the two first columnar portions 247 is greater than an outer diameter of the valve core. The shape of the valve core 25 is substantially like a barrel, an outer wall portion 251 of the valve core 25 fits with the first wall portion 2401 and the second wall portions 2402 of the valve seat, and an end surface portion 253 of the valve core 25 can abut against the end surface 2403 of the valve seat under an action of an external force. The valve core further includes an inwardly arranged position-limiting hole 252 capable of receiving an end of the push rod 213, and a bottom of the position-limiting hole 252 can abut against the push rod 213. The valve core further includes a support portion 254, and one end of the second elastic member abuts the support portion 254. The valve body includes two stepped portions in a direction toward the first port: a first stepped portion 2015 and a second stepped portion 2014. The first stepped portion 2015 forms the fourth valve port portion 2013 in the direction toward the first port, the first stepped portion 2015 may further include a guiding portion (not labeled), and the valve core 25 may accordingly be provided with a guiding portion 255. The outer wall portion 251 of the valve core 25 is in a sliding fit with an inner wall portion of a cavity 2016 between the first stepped portion 2015 and the second stepped portion 2014. One end of the second elastic member 23 abuts against the support portion 254 of the valve core, and another end of the second elastic member 23 abuts against the second stepped portion 2014. The outer wall portion 251 of the valve core 25 of this embodiment is configured to cooperate with the third valve port portion 240, and also to cooperate with the fourth valve port portion 2013. When the end surface portion 253 of the valve core 25 abuts against the end surface 2403 of the valve seat, the end surface portion 253 of the valve core 25 fits with the end surface 2403 of the valve seat, the outer wall portion 251 of the valve core fits with the inner wall portion 2401 of the annular portion 246, and the inner wall portions 2402 of the two first columnar portions 247 fit with two sides of the outer wall portion 251 of the valve core, such that the third valve port is substantially closed. The valve core 25 is spaced from the first stepped portion 2015 by a certain distance, such that the fourth valve port portion 2013 is opened. An axial distance L between the end surface 2403 of the valve seat and the first stepped portion 2015 is greater than an axial height h of the valve core. When the thermal actuator expands due to heat, the push rod 213 abuts against the valve core 25 to urge the valve core 25 to move toward the second stepped portion, until the valve core 25 partially protrudes into the cavity 2016 between the first stepped portion 2015 and the second stepped portion 2014. The cooperation between the valve core 25 and the fourth valve port substantially blocks the fourth valve port, while the end surface portion 253 of the valve core is away from the end surface 2403 of the valve seat, the fluid can flow between the end surface portion 253 and the end surface 2403, and the third valve port is opened. As can be seen, the outer wall portion of the valve core of this embodiment can cooperate with both the fourth valve port portion and the third valve port portion.

In order to ensure that the leakage of any fluid does not greatly affect the thermostatic valve and the system, the valve seat 24 of this embodiment is further provided with a discharge hole 241. The discharge hole 241 communicates the inner hole 249 of the valve seat with an outer side of the valve seat, and the valve body is provided with a discharge portion 2012 at a position corresponding to the discharge hole. The discharge portion 2012 is in communication with the discharge hole, such that even if there is fluid leakage on one side, the leakage can be discharged through the discharge hole and the discharge portion, which hardly affects the other fluid system. Moreover, in order to make the discharge effect better, a groove portion 242 is arranged at a position corresponding to the discharge hole 241, no matter from which side the fluid is leaked to the other side, the leaked fluid definitely passes through the groove portion 242 or the discharge hole. The discharge hole may be arranged anywhere at a circumference of the valve seat, and whenever there is a leakage, the leaked fluid will get out through the discharge hole. In addition, the discharge portion and the discharge hole may further be used for observation. In order to prevent external dust from falling on a surface of the push rod, a filter member (not shown) may be provided at the discharge portion 2012.

The thermal management assembly 01 includes a thermostatic valve 20 and a heat exchanger 10. The heat exchanger 10 includes a mounting plate 31, a connecting member 40, and a heat exchange core 11. The connecting member 40 is provided with a first connecting passage 401 and a second connecting passage 402. The first connecting passage 401 is in communication with the sixth port 68, the second connecting passage 402 is in communication with the fifth port 67, the first connecting passage 401 is in communication with a first fluid passage 101 of the heat exchange core, the second connecting passage 402 is in communication with a second fluid passage 103 of the heat exchange core, and the first fluid passage 101 is not in communication with the second fluid passage 103, such that the sixth port 68 is in communication with the first fluid passage 101 of the heat exchange core, the fifth port 67 is in communication with the second fluid passage 103 of the heat exchange core, and the two fluid passages are not in communication with each other. An axial position of the fifth port 67 at the thermostatic valve is different from that of the sixth port 68. In this specification, a direction in which the thermal actuator can be operated is taken as the axial direction of the thermostatic valve. In addition, it is also applicable to fix the thermostatic valve directly to the heat exchange core by welding without using the connecting member.

The thermal management assembly 01 further includes two end ports configured to connect with the system: a first end port 61 of the first fluid passage 101, and a first end port 62 of the second fluid passage 103. A second end port of the first fluid passage 101 is in communication with the first connecting passage 401 of the connecting member 40, that is, in communication with the sixth port of the thermostatic valve 20, and a second port of the second fluid passage 103 is in communication with the second connecting passage 402 of the connecting member 40, that is, in communication with the fifth port 67 of the thermostatic valve 20. In use, the first end port 61 of the first fluid passage 101 and the fourth port of the thermostatic valve are simultaneously connected to one port of a cooler 03, such as an inlet, or the first end port 61 of the first fluid passage 101 and the fourth port of the thermostatic valve may be merged and then connected to one port of the cooler 03, and another port of the cooler is connected to the third port of the thermostatic valve. The first end port 62 of the second fluid passage 103 and the first port 63 of the thermostatic valve are both connected to one port of a gearbox 02, such as an inlet, or the first end port 62 of the second fluid passage 103 and the first port 63 of the thermostatic valve are merged and then connected to one port of the gearbox 02, and another port of the gearbox 02 is connected to the second port 64 of the thermostatic valve. The connection here includes direct connection and indirect connection, such as connection through pipes or connecting members or connection through pipes and connecting members, such that the first fluid and the second fluid can respectively perform corresponding operations to meet the system's requirements for temperature control over the gearbox oil.

Figure 13:
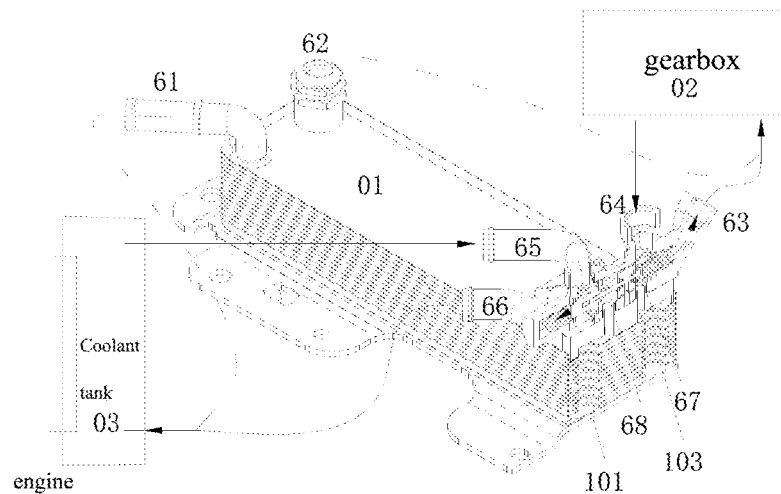
FIG. 13 is a schematic view of the application of a heat exchange component or the thermal management assembly in a first working state in the system.
Figure 14:
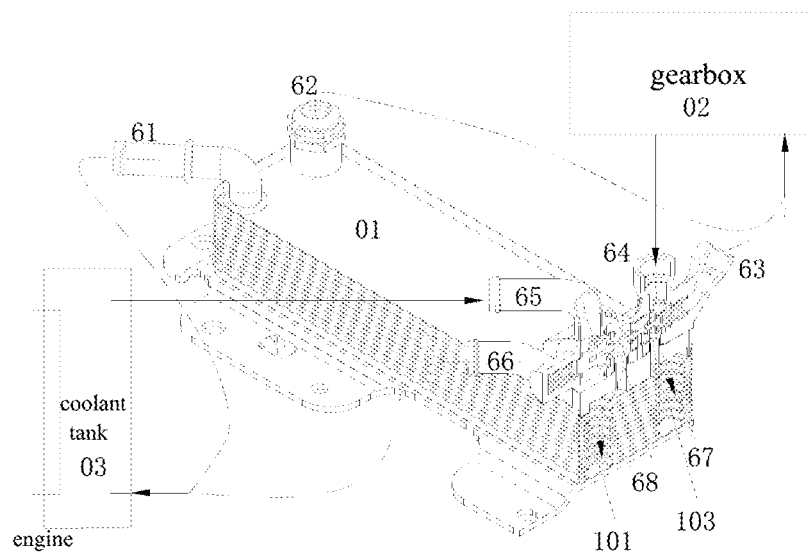
FIG. 14 is a schematic view of the application of a heat exchange component or the thermal management assembly in a second working state in the system.

When in use, the thermal management assembly is connected to the gearbox 02 and the cooler 03 for heat exchange, specifically as shown in FIGS. 13 and 14. FIG. 13 is a partially sectional view of the application of the thermal management assembly in a first working state of the system, and FIG. 14 is a partially sectional view of the application of the thermal management assembly in a second working state of the system. The thermal management assembly includes six ports or end ports configured to connect with the system, namely the first end port 61 of the first fluid passage, the first end port 62 of the second fluid passage, the first port 63, the second port 64, the third port 65 and the fourth port 66 of the thermostatic valve. Each of the gearbox 02 and the cooler 03 includes at least two ports, for example, at least one inlet and at least one outlet. The first end port 61 of the first fluid passage 101 and the fourth port 66 of the thermostatic valve are both connected to one port of the cooler 03, another port of the cooler 03 is connected to the third port 65 of the thermostatic valve, the first end port 62 of the second fluid passage 103 and the first port 63 of the thermostatic valve are both connected to one port of the gearbox 02, and another port of the gearbox 02 is connected to the second port 64 of the thermostatic valve, wherein the gearbox may be in communication with the second fluid passage of the heat exchanger, and the cooler may be in communication with the first fluid passage of the heat exchanger.

The application of the thermal management assembly 01 in the system includes at least two working modes, and the first working mode is shown in FIG. 13. When the temperature of the fluid coming out of the gearbox is relatively low, such as lower than a preset first temperature T1, the heat sensitive substance of the thermal actuator is in a relatively contracted state, the thermal actuator body is arranged relatively close to the valve seat or against the valve seat, the valve core is also arranged relatively close to the valve seat or against the valve seat, the first elastic member 22 and the second elastic member 23 are in a state of having the smallest elastic forces when in the thermostatic valve, namely, an initial deformation state. At this time, the first portion 211 abuts against the second valve port portion 243 to substantially close the second valve port 2430, and the second portion 212 is away from the first valve port portion 2022 to open the first valve port; and the valve core abuts against the end surface 2403 of the valve seat. At this time, the valve core 25 fits with the third valve port portion 240 to substantially block the third valve port, and the valve core 25 is spaced from the first stepped portion 2015 by a certain distance, such that the fourth valve port is opened. Thus, the second fluid from the gearbox flows into the second cavity of the thermostatic valve through the second port 64 of the thermostatic valve, passes through the first valve port, and flows back to the gearbox 02 directly through the first port 63 without performing heat exchange with the heat exchanger. While the first fluid from the cooler 03 flows into the first cavity of the thermostatic valve through the third port 65 of the thermostatic valve, passes through the fourth valve port, and flows back into the cooler 03 directly through the fourth port 66 without performing heat exchange with the heat exchanger. The heat exchanger is basically not working in this case.

The second working mode of the application of the thermal management assembly in the system is shown in FIG. 14. When the temperature of the fluid coming out of the gearbox is relatively high, such as higher than or equal to a preset second temperature T2, the heat sensitive substance of the thermal actuator is in a relatively expanded state, the thermal actuator body is relatively away from the valve seat or away from the second valve port, and the valve core is driven by the push rod to relatively move toward the second stepped portion or move away from the valve seat. The thermal actuator compresses the first elastic member 22 and enables the thermal actuator body to overcome the elastic force of the first elastic member 22 to move toward the first valve port portion 2022, until the second portion 212 abuts against the first valve port portion 2022, at this time, the second portion can no longer move, and then the thermal actuator overcomes the elastic force of the second elastic member 23, the push rod 213 of the thermal actuator moves toward the second stepped portion with the valve core. When the valve core moves by a certain distance, the valve core fits with the fourth valve port portion, so that the fourth valve port is blocked, and correspondingly, the end surface portion 253 of the valve core is away from the end surface 2403 of the valve seat, and the third valve port is opened. The first elastic member 22 and the second elastic member 23 are in a relatively compressed state. At this time, the first portion 211 no longer abuts against the second valve port portion, so that the second valve port 2430 is opened, and the second portion 212 abuts against the first valve port portion 2022, so that the first valve port is blocked; and the valve body no longer abuts against the end surface 2403 of the valve seat, so that the third valve port is opened. At this time, the valve core 25 fits with the fourth valve port portion 2013, so that the fourth valve port is basically blocked. Thus, the second fluid from the gearbox flows into the second cavity of the thermostatic valve through the second port 64 of the thermostatic valve, flows through the second valve port and the fifth port 67 of the thermostatic valve, then flows through the second fluid passage 103 of the heat exchanger to exchange heat with the heat exchanger, and then flows back into the gearbox 02 through the first end port 62 of the second fluid. While the first fluid from the cooler 03 flows into the first cavity of the thermostatic valve through the third port 65 of the thermostatic valve, flows into the first fluid passage 101 of the heat exchanger through the third valve port and the sixth port 68, exchanges heat with the second fluid flowing in the second fluid passage in the heat exchanger, and then flows back into the cooler 03 through the first end port 61 of the first fluid. The heat exchanger allows the two fluids to perform heat exchange in this case.

The first temperature T1 and the second temperature T2 may be preset and adjusted according to system requirements, and the second temperature T2 is greater than the first temperature T1. In addition, the heat exchange system not only includes the above two working modes, and may further be in a working mode between the two modes, such as a mode in which the first valve port and the second valve port are kept partially opened, and or a mode in which the third valve port and the fourth valve port are kept partially opened. The thermostatic valve performs a control conversion of the flow paths according to the temperature of the incoming second fluid, so that the second fluid flowing back into the gearbox is within a relatively suitable temperature range.

The two valve bodies of the above embodiments may be made of a metal material such as an aluminum alloy, and may be formed by metal casting combined with machining or by stamping and then machining, or may be formed by injection molding using a thermoplastic material or a thermosetting plastic material, then the components of the thermostatic valve are assembled with the corresponding valve bodies, and then the two valve bodies are assembled with each other and fixed by bolts or the like. The sealing members 28 may be provided between the two valve bodies to relatively seal the joint portion. In addition, the two valve bodies may be formed by profiles through machining, such as the second embodiment shown in FIGS. 15 and 16. FIG. 15 is a perspective schematic view of a thermostatic valve according to the second embodiment respectively shown from two directions, and FIG. 16 shows a perspective schematic view and a sectional schematic view of the second valve body of the thermostatic valve. The first valve body 201 is still formed by metal casting or stamping combined with machining or by injection molding, but the second valve body 202' is formed by a profile through machining, and the second valve body has an end port 2023a and an end port 2024a. The end port 2023a fits with a connecting pipe 2023, the other end port 2024a fits with another connecting pipe 2024, and the connecting pipes are fixed to the second valve body by welding, forming two ports for connection, that is the third port 65 and the fourth port 66. In addition, it is also applicable to use the two end ports provided in the second valve body 202', that is, the end port 2023a and the end port 2024a, as the third port and the fourth port for connection with the outside. The second valve body 202' has at least two projections: a first projection 2025 and a second projection 2026. The first end port 2023a is arranged in the first projection 2025, and the other end port 2024a is arranged in the second projection 2026. The first projection 2025 and the second projection 2026 are located at different portions of the second valve body in a radial direction, or in other words, the two projections are arranged separately, or the two projections may be connected to each other. In addition, for convenience of connection, the second valve body of this embodiment further includes a third projection 2027. The second valve body is provided with a threaded hole 51a at a position of the third projection 2027, and the first projection 2025 is further provided with a threaded hole 51a. The threaded hole 51a is offset from the end port 2023a located at the respective projection, that is, the threaded hole 51a and the end port 2023a are not in communication with each other, and the threaded hole 51a does not overlap with a position of the end port 2023a located at the respective projection. The threaded hole 51a is arranged substantially perpendicular to an axis of the end port 2023a located at the respective projection. In addition, the threaded hole 51a and the end port 2023a located at the respective projection may be respectively arranged at two ends of the projection, that is, axes of the two may be substantially coincident with each other or parallel to each other, so that the position of the end port 2023a is different.

The profile of the second valve body also has several projections. During processing, the profile can be machined to form two end ports, a threaded hole, and a first valve port portion 2022. The first end port 2023*a* is in communication with the fifth cavity 20202, the fourth cavity 20201 is partially opened to be in communication with the fifth cavity 20202, and a stepped portion between the fourth cavity 20201 and a partially opened hole forms the first valve port portion 2022. This method is relatively simple to process, does not require casting or injection molding, and the consistency of the profiles is relatively good. For an internal structure of this embodiment, reference may be made to the first embodiment.

The third embodiment of the thermostatic valve is described hereinafter. As shown in FIGS. 17 to 21, FIG. 17 is a perspective schematic view of the thermostatic valve, respectively shown from two directions; FIG. 18 is a sectional schematic view thereof, wherein the solid arrows indicate the manner in which two fluids in the thermostatic valve can flow, and the dashed arrows indicate another manner in which the two fluids can flow when the thermostatic valve is in another working state; FIG. 19 shows a sectional schematic view of the thermostatic valve shown in FIG. 18 taken along line D-D and line E-E; FIG. 20 is a perspective schematic view of the valve seat; and FIG. 21 shows a front view and a sectional view of the valve seat.

The thermostatic valve 2 includes a valve body 20 having a cavity, a first elastic member 22, a second elastic member 23, a valve seat assembly, a valve core 25, and a thermal actuator 21. The valve seat assembly includes a valve seat 24. Structures of the valve body 20 and the valve seat 24 are different from those of the above embodiments, and a manner in which the thermal actuator cooperates with the valve seat is also different from that of the above embodiments. The valve body 20 includes a first valve body 201 and a second valve body 202. The first valve body 201 and the second valve body 202 can be formed by plastic materials through injection molding or can be formed by metal materials through stamping or casting. The first elastic member 22, the second elastic member 23, the valve seat 24, the valve core 25, and the thermal actuator 21 are arranged in the cavity of the valve body 20, the valve seat is fixed or limited relative to the valve body, the first valve body 201 and the second valve body 202 are fixed to each other by bolts or screws 51, and sealing members 28 may be arranged at a joint portion of the first valve body 201 and the second valve body 202 to achieve a relative sealing. The valve body 20 is provided with six ports respectively connectable with the outside, and the six ports include a first port 63, a second port 64, a third port 65, a fourth port 66, a fifth port 67, and a sixth port 68. The third port 65, the fourth port 66, and the sixth port 68 can be used for communication of the first fluid; the first port 63, the second port 64, and the fifth port 67 can be used for communication of the second fluid. One of the third port 65, the fourth port 66 and the sixth port 68, for example, the third port 65 of this embodiment shown in the figures, can be used as an inlet of the first fluid, and the other two ports can be used as outlets of the first fluid. One of the first port 63, the second port 64 and the fifth port 67, for example, the second port 64 of this shown in the figures, can be used as an inlet of the second fluid, and the other two ports can be used as outlets of the second fluid.

The cavity of the valve body 20 includes a first cavity 2010 and a second cavity 2020, and the first cavity 2010 is sealed relative to the second cavity 2020. A partitioning portion 24*a*' of the valve seat assembly is provided between the first cavity 2010 and the second cavity 2020, and the push rod 213 of the thermal actuator extends from the second cavity 2020, passes through the partitioning portion 24*a*' and partially extends into the first cavity 2010. A sealing member is provided between the push rod 213 of the thermal actuator and an isolating portion of the valve seat, and a sealing member is provided between an inner wall portion of the valve body and the isolating portion of the valve seat, such that the first cavity 2010 is relatively isolated from the second cavity 2020 and will no longer communicate with the second cavity 2020. The second port 64 is in communication with the first cavity 2010, the third port 65 is in communication with the second cavity 2020, and a second valve port portion 243*a* is provided between the sixth port 68 and the second cavity 2020. The thermal actuator 21 includes a thermal actuator body, a push rod 213 and a heat sensitive substance filled in the thermal actuator, volume of the heat sensitive substance changes with temperature change, and volume change of the heat sensitive substance pushes the push rod 213 to move relative to the thermal actuator body, thereby urging the push rod to stretch or contract relative to the thermal actuator body. The thermal actuator body includes a second portion 212, and a first portion 211*a*, the second portion 212 is fixedly arranged relative to the first portion 211*a*, the first portion 211*a* is arranged between the second portion 212 and the push rod 213, and the push rod can move relative to the second portion 212 and the first portion 211 when the temperature changes. The second portion 212 is located in the second cavity 2020 or the second portion 212 is at least partially located in the second cavity 2020. The end portion of the push rod 213 is located in the first cavity 2010, or, the end portion of the push rod 213 abuts other members such as an abutting member and the abutting member extends into the first cavity 2010, that is, the push rod is arranged opposite to the second portion 212, the push rod and the second portion 212 abut the first elastic member 22 and the second elastic member 23 respectively, and the abutting herein includes direct abutting and indirect abutting. Specifically, the second portion 212 abuts one end of the first elastic member 22, and another end of the first elastic member 22 abuts the second valve body 202 to be limited. The push rod 213 abuts one end of the second elastic member 23, where the push rod indirectly abuts the second elastic member 23 via the valve core 25, and another end of the second elastic member 23 abuts the first valve body 201 to be limited, that is, two ends of the thermal actuator are respectively supported by the two elastic members.

The thermostatic valve 2 includes four valve ports, a first valve port is used for controlling communication between the fourth port 66 and the third port 65, a second valve port is used for controlling communication between the sixth port 68 and the third port 65, a third valve port is used for controlling communication between the fifth port 67 and the second port 64, and a fourth valve port is used for controlling communication between the first port 63 and the second port 64. In this embodiment, a first valve port portion 2022 having the first valve port is located at a position of a communication passage between the third port 65 and the fourth port 66, a second valve port portion 243*a* is located at a position of a communication passage between the third port 65 and the sixth port 68, the third valve port portion 240 is located at a position of a communication passage between the second port 64 and the fifth port 67, and the fourth valve port portion 2013 is located at a position of a communication passage between the second port 64 and the first port 63. The first valve port portion 2022 is arranged on the second valve body 202, the fourth valve port portion 2013 is arranged on the first valve body 201, and the second valve port portion 243a and the third valve port portion 240 are arranged on the valve seat 24. The second portion 212 of the thermal actuator 21 cooperates with the first valve port portion 2022 to realize opening and closing of the first valve port, the first portion 211a of the thermal actuator 21 cooperates with the second valve port portion 243a to realize opening and closing of the second valve port, the valve core 25 cooperates with the third valve port portion 240 to realize opening and closing of the third valve port, and the valve core 25 cooperates with the fourth valve port portion 2013 to realize opening and closing of the fourth valve port. One of the first valve port and the second valve port may be selectively closed under certain conditions, and one of the third valve port and the fourth valve port may be selectively closed under certain conditions. As for this embodiment, in a case that the temperature is lower than a certain value, the second valve port and the third valve port are closed, and the first valve port and the fourth valve port are opened; while in a case that the temperature is higher than another specific value, the second valve port and the third valve port are opened, and the first valve port and the fourth valve port are closed.

The first elastic member 22 is located in the second cavity 2020, and the second elastic member 23 is located in the first cavity 2010. The second cavity 2020 is formed by the first valve body 201, the second valve body 202, the valve seat 24, the thermal actuator 21 and the like. The first valve port portion divides the second cavity 2020 into a fourth cavity 20201 and a fifth cavity 20202, the fourth cavity 20201 is in communication with the third port 65, and the fifth cavity 20202 is in communication with the fourth port 66. The fourth cavity 20201 and the fifth cavity 20202 may communicate with each other or not through the first valve port; and the sixth port 68 and the fourth cavity 20201 may communicate with each other or not through the second valve port. An initial deformation force of the first elastic member 22 is smaller than an initial deformation force of the second elastic member 23, and the initial deformation force of the second elastic member 23 is greater than an elastic force generated by the deformation of the first elastic member 22 when the second portion of the thermal actuator comes into contact with the first valve port and shuts off the first valve port. An initial deformation force mentioned in this specification refers to a pressure required by the spring, in a compressed condition when the product is not used, to deform when subjected to an external force.

The thermal actuator may further include a position-limiting portion 214, and the first elastic member 22 may be sleeved on the position-limiting portion, that is, the first elastic member is limited by the position-limiting portion 214. Accordingly, the thermal actuator is also supported by the first elastic member 22. A transition section may be provided between the first portion and the second portion of the thermal actuator. The first portion and the second portion may be integrated, for example, formed as a cylindrical structure, one end of the cylinder serves as the first portion and functions as the first portion, and another end serves as the second portion and functions as the second portion. Or the first portion and the second portion may be a combination of two cylindrical structures having stepped portions, similarly, one end of the combined structure serves as the first portion and functions as the first portion, and another end of the combined structure serves as the second portion and functions as the second portion.

The valve seat 24 is provided with the second valve port portion 243a and the third valve port portion 240. The valve seat 24 includes at least two first columnar portions 247, at least two second columnar portions 248, a substantially semi-annular portion 246, and another substantially semi-annular portion 243, and the isolating portion. The first columnar portions 247 and the second columnar portions 248 also serve as connecting portions, the second columnar portions 248 herein as a part of the second valve port portion 243a connect another part of the second valve port portion 243a, that is, the semi-annular portion, to the isolating portion, or in other words, the second columnar portions 248 allow the second valve port portion 243a and the isolating portion to form a whole. An inner surface of each second columnar portion 248 has a substantially circular arc-like structure as viewed from the axial direction, or in other words, cross sections of inner sides of the two columnar portions may be two arcs, and the inner surface is in a sliding fit with an outer wall of the first portion of the thermal actuator. The second valve port portion 243a includes the semi-annular portion 243, the two second columnar portions 248, and a part of an end surface 243a4 of the isolating portion facing the second columnar portions 248. An end surface of the first portion of the thermal actuator facing the end surface 243a4 can cooperate with the end surface 243a4 of the isolating portion. An inward first wall portion 243a1 of the semi-annular portion 243, inward second wall portions 243a2 of the two columnar portions 248, and the end surface 243a4 of the isolating portion facing the second columnar portions 248 together form the second valve port. The shape of the second valve port matches with that of the first portion. Further, a part of the end surface 243a4 of the isolating portion facing the second columnar portions 248 may exhibit in a partially inwardly concave structure as shown in FIGS. 20 and 21, such that a guiding portion 243a3 is formed. The size of a portion of the guiding portion 243a3 relatively close to the end surface 243a4 may match the size of the first portion 211a, such that the guiding portion 243a3, the inward first wall portion 243a1 of the semi-annular portion 243 and the inward second wall portions 243a2 of the second columnar portions 248 together cooperate with first portion 211a to achieve a relative sealing. The shape of the first portion 211a is substantially cylindrical. The inward first wall portion 243a1 of the semi-annular portion 243, the inward second wall portions 243a2 of the two second columnar portions 248, and the guiding portion 243a3 constitute the second valve port; or, the guiding portion 243a3, the end surface 243a4, the inward first wall portion 243a1 of the semi-annular portion 243 and the inward second wall portions 243a2 of the two second column portions 248 may constitute the second valve port capable of cooperating with the first portion 211a of the thermal actuator.

The valve seat 24 is further provided with an inner hole 249 at the isolating portion, and the push rod can pass through the inner hole 249. The overall push rod may be a cylindrical structure, and a minimum size of the inner hole 249 of the valve seat is greater than the size of the push rod of the thermal actuator by about 0.10 mm to 0.5 mm. The structure of the third valve port portion may be similar to that of the second valve port portion. The third valve port portion 240 includes a substantially semi-annular portion 246, at least two first columnar portions 247, and a part of the end surface 2403 of the isolating portion facing the first columnar portions 247. The end surface 2403 may be planar or partially concave. The inward first wall portion 2401 of the semi-annular portion 246, the inward second wall portions 2402 of the two first columnar portions 247, and the end surface 2403 of the isolating portion facing the first columnar portions 247 constitute the third valve port.

Shapes of the first wall portion 2401, the inward second wall portions 2402 of the two first columnar portions 247 match with the shape of the valve core 25, and the valve core is in a sliding fit with the third valve port portion 240. A maximum distance between the inward second wall portions 2402 of the two first columnar portions 247 is greater than an outer diameter of the valve core. The shape of the valve core 25 is substantially like a barrel, an outer wall portion 251 of the valve core 25 cooperates with the first wall portion 2401 and the second wall portions 2402 of the valve seat, and an end surface portion 253 of the valve core 25 can abut against the end surface 2403 of the valve seat under an action of an external force. The valve core further includes an inwardly arranged position-limiting hole 252 capable of receiving the end of the push rod 213, and a bottom of the position-limiting hole 252 can abut against the push rod 213. The valve core further includes a support portion 254, and one end of the second elastic member abuts against the support portion 254. The valve body includes two stepped portions in a direction toward the first port: a first stepped portion 2015 and a second stepped portion 2014. The first stepped portion 2015 forms the fourth valve port portion 2013 in the direction toward the first port, the first stepped portion 2015 may further include a guiding portion (not labeled), and the valve core 25 may accordingly be provided with a guiding portion 255. The outer wall portion 51 of the valve core 25 is in a sliding fit with an inner wall portion of a cavity between the first stepped portion 2015 and the second stepped portion 2014, and a clearance therebetween is roughly between 0.10 mm and 0.5 mm. One end of the second elastic member 23 abuts against the support portion 254 of the valve core, and another end of the second elastic member 23 abuts the second stepped portion 2014. The outer wall portion 251 of the valve core 25 is configured to cooperate with the third valve port portion 240, and also to cooperate with the fourth valve port portion 2013. When the end surface portion 253 of the valve core 25 abuts against the end surface 2403 of the valve seat, the end surface portion 253 of the valve core 25 cooperates with the end surface 2403 of the valve seat, the outer wall portion 251 of the valve core cooperates with the inner wall portion 2401 of the semi-annular portion 246, and the inner wall portions 2402 of the two first columnar portions 247 fit with two sides of the outer wall portion of the valve core, such that the third valve port is substantially closed. The valve core 25 is spaced from the first stepped portion 2015 by a certain distance, such that the fourth valve port portion 2013 is opened. An axial distance L between the end surface 2403 of the valve seat and the first stepped portion 2015 is greater than an axial height h of the valve core, in other words, an axial distance L between the end surface 2403 of the valve seat and the fourth valve port portion is greater than an axial height of the valve core. When the thermal actuator expands due to heat, the push rod abuts against the valve core 25 to push the valve core 25 to move toward the second stepped portion, until the valve core 25 partially protrudes into the cavity 2016 between the first stepped portion 2015 and the second stepped portion 2014, and the fourth valve port is substantially blocked, while the end surface portion 253 of the valve core is away from the end surface 2403 of the valve seat, the fluid can flow between the end surface portion 253 and the end surface 2403, and the third valve port is opened. As can be seen, the outer wall portion of the valve core of this embodiment can cooperate with both the fourth valve port portion and the third valve port portion. In addition, the structure of the valve seat of this embodiment may be partially concaved, that is, similar to the structure of the second valve port. The second valve port may be embodied in multiple forms.

The valve seat assembly 24' is fixedly arranged relative to the valve body, such as limited in the cavity of the first valve body by a retainer 27. When assembling, the second elastic member, the valve core, and the valve seat may be first assembled with the first valve body, then the retainer 27 is fitted in the first valve body 201, the first elastic member and the thermal actuator are assembled with the second valve body, and then the two assembled valve bodies are assembled together and are fixed by bolts or the like. The valve seat assembly 24' is provided with a partitioning portion 24a'. The partitioning portion 24a' separates the cavity in the valve body, so that the first cavity 2010 is relatively sealed and isolated from the second cavity 2020. In this embodiment, the partitioning portion 24a' cooperates with the push rod to divide the cavity of the first valve body 201 into the first cavity 2010 and a side cavity facing the second valve body. The side cavity facing the second valve body and the second valve body form the second cavity 2020, such that two sides can be used for different fluids, that is, two different fluids can flow in the thermostatic valve, and flow modes of the two fluids can change according to the temperature change. The valve seat assembly 24' includes the valve seat 24, a position-limiting member 26, at least one sealing member 28 limited at an outward portion of the valve seat, and at least one sealing member 28 limited at an inward portion of the valve seat. The sealing member 28 at the outward portion of the valve seat is configured to cooperate with an inner wall portion of the valve body to achieve sealing, and the sealing member 28 at the inward portion of the valve seat is arranged around the push rod 213 and is configured to be in a sliding fit with the push rod 213 to achieve dynamic sealing. The position-limiting member 26 is configured to limit the position of the sealing member 28 for the dynamic sealing, so that the sealing member will not fall off during operation. In a case where the sealing can be achieved or the sealing requirements are not too high, one sealing member 28 may be provided on each side, thus the structure is relatively simple. Two sealing members may be provided on each side to ensure the sealing, if the sealing requirements are relatively high. As shown in FIG. 18, two grooves are provided at the relatively outward portion of the valve seat of the present embodiment, which are groove 245 and groove 244, and one sealing member 28 is limited in each of the grooves for cooperating with the inner wall portion of the valve body to achieve sealing. Two sealing member receiving portions are provided at the inward portion of the valve seat as well, and the position-limiting member 26 is used to limit the position of the sealing members after the sealing members 28 are placed in the sealing member receiving portions. In addition, the position-limiting member may not be provided. Grooves may be provided at an inner position of the valve seat, so that the sealing members can be placed in the grooves, which can also limit the position of the sealing members.

In order to ensure that the leakage of any fluid does not greatly affect the thermostatic valve and the system, the valve seat 24 of this embodiment is further provided with a discharge hole 241. The discharge hole 241 communicates the inner hole 249 of the valve seat with an outer side of the valve seat, and the valve body is provided with a discharge portion 2012 at a position corresponding to the discharge hole 241, such that even if there is fluid leakage on one side, the leakage can be discharged through the discharge hole and the discharge portion, which hardly affects the other fluid system; moreover, in order to make the discharge effect better, a groove portion 242 is arranged at a position corresponding to the discharge hole 241. No matter from which side the fluid is leaked to the other side, the fluid leakage definitely passes through the groove portion 242 or the discharge hole, so the fluid leakage always gets out through here. In addition, the discharge portion and the discharge hole may further be used for observation. In order to prevent external dust from falling on a surface of the push rod, a filter member (not shown) may be provided at the discharge portion 2012. In this embodiment, during operation of the thermal actuator, the first portion 211a of the thermal actuator may always have a part in cooperation with the second valve port. In other words, the first portion always cooperates with the semi-annular portion 243 of the second valve port portion, thereby guiding the thermal actuator during operation, limiting the position of the thermal actuator, and making the operation of the thermal actuator more smooth and reliable.

For specific use and connections of this embodiment, reference may be made to the first embodiment above, and the thermostatic valve may be assembled with the heat exchanger to form the thermal management assembly as well. The thermal management assembly includes a thermostatic valve and a heat exchanger 10. The heat exchanger 10 includes a mounting plate 31, a connecting member 40, and a heat exchange core 11. The connecting member 40 is provided with a first connecting passage 401 and a second connecting passage 402. The first connecting passage 401 is in communication with the sixth port 68, the second connecting passage 402 is in communication with the fifth port 67, the first connecting passage 401 is in communication with a first fluid passage 101 of the heat exchange core, and the second connecting passage 402 is in communication with a second fluid passage 103 of the heat exchange core, such that the sixth port 68 is in communication with the first fluid passage 101 of the heat exchange core, the fifth port 67 is in communication with the second fluid passage 103 of the heat exchange core, and the two fluid passages are not in communication with each other. An axial position of the fifth port 67 on the thermostatic valve is different from those of the sixth port 68, the fourth port 66 and the first port 63. In this specification, a direction in which the thermal actuator can be operated is taken as the axial direction of the thermostatic valve. In addition, the connection in the present specification includes not only direct connection but also a case of connection by other components, that is, indirect connection, and the communication includes not only direct communication but also a case of communication through other components, that is, indirect communication.

In the above embodiments, the first valve port portion abuts against the thermal actuator, alternatively, the cooperation between the first valve port portion and the thermal actuator may also be similar to that of the fourth valve port portion, that is, the thermal actuator may further extend into the cavity, that is, the fifth cavity, where the first valve port is located, after relatively closing the first valve port, in this case, the fourth valve port portion may use the abutting manner, which is similar to the manner of the first valve port portion. In this case, requirements for the first elastic member and the second elastic member are relatively high, which is also applicable.

The above description is only specific embodiments of the present application, rather than limitation of the present application in any form. Although the present application has been disclosed above in the preferred embodiments, it is not intended to limit the present application. Many variations and modifications may be made to the technical solution of the present application, or equivalent embodiments may be modified from the technical solution by those skilled in the art based on the technical contents disclosed above without departing from the scope of the present application. Therefore, all contents without departing from the technical solution of the present application, and any simple alterations, equivalent variations and modifications made to the embodiments based on the technical substance of the present application should all fall in the scope of protection of the present application.

The invention claimed is:

1. A thermostatic valve comprising a valve body, a first elastic member, a second elastic member, a valve seat assembly, a valve core, and a thermal actuator, wherein the valve seat assembly comprises a valve seat; the valve body comprises a first valve body and a second valve body; the first elastic member, the second elastic member, the valve seat assembly, the valve core, and the thermal actuator are arranged in the valve body; and the valve seat assembly is fixed or limited relative to the valve body; and the thermostatic valve comprises six ports, the six ports comprise a first port, a second port, a third port, a fourth port, a fifth port, and a sixth port; the thermostatic valve comprises four valve port portions each having a valve port, the four valve port portions comprise a first valve port portion, a second valve port portion, a third valve port portion, and a fourth valve port portion, the first valve port portion is arranged in the valve body, and the fourth valve port portion is arranged in the valve body; and the thermostatic valve comprises a first cavity and a second cavity, the first cavity is isolated from the second cavity, the first valve port portion is arranged in the second cavity, the fourth valve port portion is arranged in the first cavity, the first elastic member is arranged in the second cavity, the second elastic member is arranged in the first cavity, a part of the thermal actuator is arranged in the first cavity, and another part of the thermal actuator is arranged in the second cavity; and one end of the thermal actuator abuts against the first elastic member, and another end of the thermal actuator abuts against the second elastic member; one of the third port, the fourth port and the sixth port is in communication with the second cavity, and the other two of the third port, the fourth port and the sixth port are configured to be in communication with the second cavity through valve ports; and one of the first port, the second port and the fifth port is in communication with the first cavity, and the other two of the first port, the second port and the fifth port are configured to be in communication with the first cavity through valve ports.

2. The thermostatic valve according to claim 1, wherein the first valve port portion is arranged in the second valve body or a second valve body component, the fourth valve port portion is arranged in the first valve body or a first valve body component, and the first valve body or the first valve body component is fixed or limited relative to the second valve body or the second valve body component; and the valve seat assembly comprises the second valve port portion and the third valve port portion; the valve seat assembly is partially located in the first cavity and partially located in the second cavity, or the valve seat assembly is a part of the second cavity; the valve seat assembly comprises a partitioning portion, the partitioning portion is in cooperation with the thermal actuator, two sides of the partitioning portion are not in communication with each other, and the first cavity is not in communication with the second cavity; and the third port is in communication with the second cavity, the fourth port is configured to be in communication with the third port through the first valve port of the first valve port portion, the sixth port is configured to be in communication with the third port through the second valve port of the second valve port portion, and at least one of the fourth port and the sixth port is in communication with the second cavity; and the second port is in communication with the first cavity, the first port is configured to be in communication with the second port through the fourth valve port of the fourth valve port portion, and the fifth end port is configured to be in communication with the second port through the third valve port of the third valve port portion, and at least one of the first port and the fifth port is in communication with the first cavity.

3. The thermostatic valve according to claim 2, wherein the valve seat assembly comprises a valve seat, and at least one sealing member limited at an outward portion of the valve seat, and the sealing member at the outward portion of the valve seat is located between the valve seat and an inner wall portion of the valve body and is configured to cooperate with the inner wall portion of the valve body to achieve sealing; and the valve seat assembly is sealed relative to the thermal actuator, and the valve seat assembly is in cooperation with the thermal actuator to make the first cavity and the second cavity of the valve body not communicated; and the thermal actuator comprises a push rod, and one end of the push rod passes through the valve seat assembly and is partially located in the first cavity.

4. The thermostatic valve according to claim 2, wherein the valve seat assembly comprises a valve seat, at least one sealing member limited at an outward portion of the valve seat, and at least one sealing member limited at an inward portion of the valve seat; the sealing member at the outward portion of the valve seat is located between the valve seat and an inner wall portion of the valve body and is configured to cooperate with the inner wall portion of the valve body to achieve sealing; and the thermal actuator comprises a push rod and a body portion, the sealing member at the inward portion of the valve seat is located between the valve seat and the push rod and is configured to cooperate with the push rod to realize dynamic sealing.

5. The thermostatic valve according to claim 4, wherein the thermal actuator is configured to cooperate with the first valve port portion and the second valve port portion to block the first valve port or the second valve port, and the valve core is configured to cooperate with the third valve port portion and the fourth valve port portion to block the third valve port or the fourth valve port; and the thermostatic valve comprises at least two working modes: a first working mode and a second working mode; in the first working mode, the thermal actuator is in an initial state, or in other words, a length of the thermal actuator is relatively short, the thermal actuator is in cooperation with the second valve port portion to substantially block the second valve port, and the valve core is in cooperation with the third valve port portion to substantially block the third valve port, the thermal actuator does not close the first valve port portion, the valve core does not close the fourth valve port portion, and the first valve port and the fourth valve port are opened; and in the second working mode, the thermal actuator is in a state of having relatively high temperature, or in other words, the length of the thermal actuator is relatively long, the second valve port and the third valve port are opened, the thermal actuator fits with the first valve port portion to substantially block the first valve port, and the valve core fits with the fourth valve port portion to substantially block the fourth valve port.

6. The thermostatic valve according to claim 1, wherein the thermal actuator is configured to cooperate with the first valve port portion and the second valve port portion to block the first valve port or the second valve port, and the valve core is configured to cooperate with the third valve port portion and the fourth valve port portion to block the third valve port or the fourth valve port; and the thermostatic valve comprises at least two working modes: a first working mode and a second working mode; in the first working mode, the thermal actuator is in an initial state, or in other words, a length of the thermal actuator is relatively short, the thermal actuator is in cooperation with the second valve port portion to substantially block the second valve port, and the valve core is in cooperation with the third valve port portion to substantially block the third valve port, the thermal actuator does not close the first valve port portion, the valve core does not close the fourth valve port portion, and the first valve port and the fourth valve port are opened; and in the second working mode, the thermal actuator is in a state of having relatively high temperature, or in other words, the length of the thermal actuator is relatively long, the second valve port and the third valve port are opened, the thermal actuator fits with the first valve port portion to substantially block the first valve port, and the valve core fits with the fourth valve port portion to substantially block the fourth valve port.

7. The thermostatic valve according to claim 6, wherein the thermostatic valve further comprises a third cavity, the first cavity is sealed relative to the third cavity, the third cavity is located between the first cavity and the second cavity, the second port is in communication with the first cavity, the third port is in communication with the second cavity, and the sixth port is in communication with the third cavity; and the third cavity is configured to be in communication with the second cavity through the second valve port of the second valve port portion; and the valve seat assembly comprises at least two first columnar portions, at least one second columnar portion, and a partitioning portion, and the partitioning portion is relatively located between the first columnar portions and the second columnar portion; the valve seat assembly is provided with the second valve port portion and the third valve port portion, the second column portion connects the second valve port portion to the partitioning portion, and the second column portion is located between the second valve port portion and the partitioning portion.

8. The thermostatic valve according to claim 1, wherein the thermostatic valve further comprises a third cavity, the first cavity is sealed relative to the third cavity, the third cavity is located between the first cavity and the second cavity, the second port is in communication with the first cavity, the third port is in communication with the second cavity, and the sixth port is in communication with the third cavity; and the third cavity is configured to be in communication with the second cavity through the second valve port of the second valve port portion; and the valve seat assembly comprises at least two first columnar portions, at least one second columnar portion, and a partitioning portion, and the partitioning portion is relatively located between the first columnar portions and the second columnar portion; the valve seat assembly is provided with the second valve port portion and the third valve port portion, the second column portion connects the second valve port portion to the partitioning portion, and the second column portion is located between the second valve port portion and the partitioning portion.

9. The thermostatic valve according to claim 8, wherein the valve seat assembly further comprises an approximate semi-annular portion, the two first columnar portions connect the semi-annular portion to the partitioning portion, an inner surface of each of the first columnar portions has an approximate circular arc-like structure as viewed from an axial direction, each of the first columnar portion axially extends to form an approximate columnar structure, an inner surface of the semi-annular portion has an circular arc-like structure as viewed from the axial direction, the semi-annular portion and the first columnar portions are part of the third valve port portion, and the valve core is in a sliding fit with the semi-annular portion and the inner surfaces of the first columnar portions.

10. The thermostatic valve according to claim 8, wherein the valve seat assembly further comprises an approximate semi-annular portion, the two first columnar portions connect the semi-annular portion to the partitioning portion, an inner surface of each of the first columnar portions has an approximate circular arc-like structure as viewed from an axial direction, each of the first columnar portion axially extends to form an approximate columnar structure, an inner surface of the semi-annular portion has a circular arc-like structure as viewed from the axial direction, the semi-annular portion and the first columnar portions are part of the third valve port portion, and the valve core is in a sliding fit with the semi-annular portion and the inner surfaces of the first columnar portions; and the valve body is provided with two stepped portions in a direction towards the first port: a first stepped portion and a second stepped portion, the two stepped portions form the fourth valve port portion, and the valve core is in a sliding fit with an inner wall portion of a cavity formed between the first stepped portion and the second stepped portion; the valve core comprises a support portion, one end of the second elastic member abuts against the support portion of the valve core, the thermal actuator abuts against the second elastic member through the valve core, and another end of the second elastic member abuts against the second stepped portion of the valve body.

11. The thermostatic valve according to claim 8, wherein the thermal actuator comprises a push rod and a thermal actuator body, the thermal actuator body comprises a second portion and a first portion, the second portion is fixedly arranged relative to the first portion, the first portion is arranged between the second portion and the push rod, and the push rod is movable relative to the second portion and the first portion when a temperature changes; and the second portion is at least partially located in the second cavity, the push rod passes through the partitioning portion to allow one end of the push rod to be located in the first cavity, the thermal actuator abuts against the first elastic member through the second portion, and the thermal actuator abuts against the second elastic member through the push rod; and the first valve port portion has a stepped structure, the second portion is in cooperation with the first valve port portion, and the second portion is at least partially larger than a stepped hole of the first valve port portion; and the second valve port portion has an annular structure, the first portion is in cooperation with the second valve port portion, and the first portion is at least partially larger than an annular hole of the second valve port portion.

12. The thermostatic valve according to claim 11, wherein the partitioning portion further comprises at least one discharge hole and an inner through hole, the discharge hole is in communication with the inner through hole of the partitioning portion, and the discharge hole is in communication with an outer side of the partitioning portion; and the valve body is provided with a discharge portion at a position corresponding to the discharge hole, and the discharge portion is in communication with the discharge hole.

13. The thermostatic valve according to claim 12, wherein the valve seat assembly further comprises a groove portion, an axial position of the groove portion on the thermostatic valve at least partially overlaps with an axial position of the discharge hole on the thermostatic valve, the discharge hole is in communication with the groove portion, the discharge portion of the valve body is in communication with the groove portion, and the discharge portion is in communication with the discharge hole through the groove portion.

14. The thermostatic valve according to claim 11, wherein an initial deformation force of the first elastic member is smaller than an initial deformation force of the second elastic member, and the initial deformation force of the second elastic member is greater than an elastic force generated by deformation of the first elastic member when the second portion of the thermal actuator abuts against the first valve port portion; and the valve core is configured to fit with the fourth valve port portion to substantially block the fourth valve port, and to fit with the third valve port portion to substantially block the third valve port, the valve core abuts against the valve seat when the third valve port is substantially blocked; and an axial distance between an end surface of the valve seat for abutting the valve core and the first stepped portion is greater than an axial height of the valve core; and at least part of a shape of the valve core is approximate to a barrel or a cylinder, a maximum distance between inner wall portions of the two first cylindrical portions is greater than an outer diameter of the valve core, and the second elastic member abuts against the push rod through the valve core.

15. The thermostatic valve according to claim 1, wherein the first valve body and/or the second valve body are formed by metal casting combined with machining or by stamping and then machining, or are formed by injection molding using a thermoplastic material or a thermosetting plastic material, or are formed by machining using a profile, and the first valve body and the second valve body are fixedly connected to each other by bolts or by buckles, and at least one sealing member is provided between the first valve body and the second valve body.

16. A thermal management assembly, comprising a thermostatic valve and a heat exchanger, wherein the thermostatic valve is fixedly arranged relative to the heat exchanger, the heat exchanger comprises a heat exchange core, the heat exchanger comprises a first fluid passage and a second a fluid passage, the first fluid passage and the second fluid passage are not in communication with each other, the thermostatic valve is the thermostatic valve according to claim 1, the sixth port is in communication with the first fluid passage, and the fifth port is in communication with the second fluid passage.

17. The thermal management assembly according to claim 16, wherein the heat exchanger or the thermostatic valve comprises a mounting plate and a connecting member, and the connecting member is arranged at a side of the heat exchanger facing the thermostatic valve or at a side of the thermostatic valve facing the heat exchanger; and the connecting member is provided with a first connecting passage and a second connecting passage, the first connecting passage is in communication with the sixth port, the second connecting passage is in communication with the fifth port, the first connecting passage is in communication with the first fluid passage of the heat exchange core, the second connecting passage is in communication with the second fluid passage of the heat exchange core, the sixth port is in communication with the first fluid passage of the heat exchange core through the first connecting passage, and the fifth port is in communication with the second fluid passage of the heat exchange core through the second connecting passage; and an axial position of the fifth port on the thermostatic valve is different from an axial position of the sixth port on the thermostatic valve; and the thermal management assembly further comprises two ports: a first port of the first fluid passage and a first port of the second fluid passage.

* * * * *